United States Patent
Moroz et al.

(10) Patent No.: US 10,417,373 B2
(45) Date of Patent: Sep. 17, 2019

(54) ESTIMATION OF EFFECTIVE CHANNEL LENGTH FOR FINFETS AND NANO-WIRES

(71) Applicant: SYNOPSYS, INC., Mountain View, CA (US)

(72) Inventors: Victor Moroz, Saratoga, CA (US); Yong-Seog Oh, Pleasanton, CA (US); Stephen Lee Smith, Mountian View, CA (US); Michael C. Shaughnessy-Culver, Napa, CA (US); Jie Liu, San Jose, CA (US)

(73) Assignee: SYNOPSYS, INC., Mountain View, CA (US)

( * ) Notice: Subject to any disclaimer, the term of this patent is extended or adjusted under 35 U.S.C. 154(b) by 137 days.

(21) Appl. No.: 15/024,009

(22) PCT Filed: Sep. 26, 2014

(86) PCT No.: PCT/US2014/057637
§ 371 (c)(1),
(2) Date: Mar. 22, 2016

(87) PCT Pub. No.: WO2015/048400
PCT Pub. Date: Apr. 2, 2015

(65) Prior Publication Data
US 2016/0246915 A1 Aug. 25, 2016

Related U.S. Application Data

(60) Provisional application No. 61/887,153, filed on Oct. 4, 2013, provisional application No. 61/883,942, filed on Sep. 27, 2013, provisional application No. 61/883,158, filed on Sep. 26, 2013.

(51) Int. Cl.
G06F 17/50 (2006.01)
H01L 29/66 (2006.01)
H01L 29/78 (2006.01)

(52) U.S. Cl.
CPC ...... G06F 17/5081 (2013.01); G06F 17/5009 (2013.01); G06F 17/5036 (2013.01);
(Continued)

(58) Field of Classification Search
CPC .................. G06F 17/5009; G06F 17/5081
See application file for complete search history.

(56) References Cited

U.S. PATENT DOCUMENTS

| 5,246,800 | A | 9/1993 | Muray |
| 5,472,814 | A | 12/1995 | Lin |

(Continued)

FOREIGN PATENT DOCUMENTS

| WO | 00-72185 A2 | 11/2000 |
| WO | 01-08028 A2 | 2/2001 |
| WO | 02-058158 A2 | 7/2002 |

OTHER PUBLICATIONS

PCT/US2014/057637—International Search Report and Written Opinion dated Jan. 5, 2015, 12 pages.
(Continued)

*Primary Examiner* — Jack Chiang
*Assistant Examiner* — Aric Lin
(74) *Attorney, Agent, or Firm* — Haynes Beffel & Wolfeld LLP (57) ABSTRACT

Roughly described, a system for estimating an effective channel length of a 3D transistor having a gate length below 20 nm involves estimating an effective volume of the channel and a cross-sectional area of the channel, and estimating the effective channel length as the ratio of effective volume to cross-sectional area. Preferably the effective volume is estimated as the sum of the Voronoi volumes within containing boundaries of the channel, excluding those volumes having a dopant concentration above the source/drain dopant concentration at the carrier injection point. The containing boundaries can be identified using geometry data describing the transistor, particularly the data identifying inner surfaces of the gate dielectric. The estimated effective channel length can be used in TCAD level analysis of the transistor and calculating characteristics of the transistor as needed for circuit simulation.

21 Claims, 8 Drawing Sheets

(52) U.S. Cl.
CPC .... *G06F 17/5063* (2013.01); *H01L 29/66795* (2013.01); *H01L 29/785* (2013.01)

(56) References Cited

U.S. PATENT DOCUMENTS

| | | |
|---|---|---|
| 5,702,847 A | 12/1997 | Tarumoto et al. |
| 6,057,063 A | 5/2000 | Liebmann et al. |
| 6,096,458 A | 8/2000 | Hibbs |
| 6,685,772 B2 | 2/2004 | Goddard, III et al. |
| 7,448,022 B1 | 11/2008 | Ram et al. |
| 7,756,687 B2 | 7/2010 | Hwang et al. |
| 8,112,231 B2 | 2/2012 | Samukawa |
| 8,453,102 B1 | 5/2013 | Pack et al. |
| 8,454,748 B2 | 6/2013 | Iwaki et al. |
| 8,555,281 B1 | 10/2013 | van Dijk et al. |
| 8,572,523 B2 | 10/2013 | Tuncer et al. |
| 8,626,480 B2 | 1/2014 | Chang et al. |
| 2002/0142495 A1 | 10/2002 | Usujima |
| 2003/0217341 A1 | 11/2003 | Rajsuman et al. |
| 2003/0217343 A1 | 11/2003 | Rajsuman et al. |
| 2004/0063225 A1 | 4/2004 | Borden et al. |
| 2004/0067355 A1 | 4/2004 | Yadav et al. |
| 2005/0223633 A1 | 10/2005 | Sankaranarayanan |
| 2005/0278124 A1 | 12/2005 | Duffy et al. |
| 2005/0281086 A1 | 12/2005 | Kobayashi et al. |
| 2006/0038171 A1 | 2/2006 | Hasumi et al. |
| 2006/0101378 A1 | 5/2006 | Kennedy et al. |
| 2007/0177437 A1 | 8/2007 | Guo |
| 2007/0185695 A1 | 8/2007 | Neumann |
| 2007/0265725 A1 | 11/2007 | Liu et al. |
| 2008/0052646 A1 | 2/2008 | Tuncer et al. |
| 2008/0147360 A1 | 6/2008 | Fejes et al. |
| 2009/0032910 A1 | 2/2009 | Ahn et al. |
| 2010/0070938 A1 | 3/2010 | Wang et al. |
| 2011/0131017 A1 | 6/2011 | Cheng et al. |
| 2011/0161361 A1 | 6/2011 | Csanyi et al. |
| 2011/0231804 A1 | 9/2011 | Liu et al. |
| 2011/0246998 A1 | 10/2011 | Vaidya et al. |
| 2011/0313748 A1 | 12/2011 | Li |
| 2012/0228615 A1 | 9/2012 | Uochi |
| 2012/0232685 A1 | 9/2012 | Wang et al. |
| 2013/0139121 A1 | 5/2013 | Wu et al. |
| 2014/0180645 A1 | 6/2014 | Lee et al. |
| 2015/0088473 A1 | 3/2015 | Liu et al. |
| 2015/0088481 A1 | 3/2015 | Liu et al. |
| 2015/0089511 A1 | 3/2015 | Smith et al. |
| 2015/0120259 A1 | 4/2015 | Klimeck et al. |
| 2016/0171139 A1 | 6/2016 | Tago et al. |
| 2016/0335381 A1 | 11/2016 | Liu et al. |

OTHER PUBLICATIONS

Wang, Yan, "Multiscale Simulations", Georgia Institute of Technology, available at http://www-old.me.gatech.edu/~ywang/CANE/lect05_MultiscaleSims_yanwang.pdf, (dated May 14-16, 2012), 40 pages.

Braunstein, Rubin, et al., "Intrinsic Optical Absorption in Germanium-Silicon Alloys", Physical Review, vol. 109, No. 3, (Feb. 1, 1958), pp. 695-710.

Sant, Saurabh, et al., "Band gap bowing and band offsets in relaxed and strained Si1-xGex alloys by employing a new nonlinear interpolation scheme", published online Jan. 18, 2013, Journal of Applied Physics, vol. 113, pp. 033708-1 through 033708-10.

Uppal, S., et al., "Diffusion of boron in germanium at 800-900° C.", Journal of Applied Physics, vol. 96, No. 3, (Aug. 1, 2004), pp. 1376-1380.

Haddara, Y.M., et al., "Accurate measurements of the intrinsic diffusivities of boron and phosphorus in silicon", Applied Physics Letters, vol. 77, No. 13, (Sep. 25, 2000), pp. 1976-1978.

Uppal, S., et al., "Diffusion of ion-implanted boron in germanium", Journal of Applied Physics, vol. 90, No. 8, (Oct. 2001), 4293-4295.

Stadler, J., et al., "IMD: a Software Package for Molecular Dynamics Studies on Parallel Computers", International Journal of Modren Physics C, vol. 8, No. 5, (Oct. 1997), pp. 1131-1140.

Refson, Keith, "Moldy: a portable molecular dynamics simulation program for serial and parallel computers", Computer Physics Communications, vol. 126, issue 3, (Apr. 11, 2000), pp. 310-329.

Smith, W., et al., "DL_POLY: Application to molecular simulation", Molecular Simulation, vol. 28, Issue 5, (May 5, 2002), pp. 385-471.

Smith, W., and Forester, T.R., "DL_POLY_2.0: A general-purpose parallel molecular dynamics simulation package", Journal of Molecular Graphics, vol. 14, Issue 3, (Jun. 1996), pp. 136-141.

Nieminen, Risto M., "From atomistic simulation towards multiscale modelling of materials", J. Phys.: Condens. Matter, (published Mar. 8, 2002), vol. 14, pp. 2859-2876.

"Simulation of Random Dopant Fluctuation Effects in TCAD Sentaurus", TCAD News, Dec. 2009, Synopsys, Mountain View, CA, USA, 4 pages.

Yu, P.Y., and Cardona, M., "2. Electronic Band Structures", Fundamentals of Seminconductors, Graduate Texts in Physics, 4th ed., Springer-Verlag Berlin Heidelberg, (2010), pp. 17-106.

"ITRS, International Technology Roadmap for Semiconductors, 2012 Update", (2012), available at http://www.itrs.net/Links/2012ITRS/2012Chapters/2012Overview.pdf, 76 pages.

"Sentaurus TCAD" datasheet, Synopsys, Inc., Mountain View, CA USA, May 2012, 4 pages.

"ITRS, 2012 Overall Roadmap Technology Characteristics (ORTC) Tables", International Technology Roadmap for Semiconductors, 2012, availalbe at http://www.itrs.net/Links/2012ITRS/2012Tables/ORTC_2012Tables.xlsm, visited Oct. 14, 2013, 39 pages.

Hansen, Stephen E., "SUPREM-III User's Manual, Version 8628", (Aug. 1986), available from http://www-tcad.stanford.edu/tcad/programs/suprem3man.pdf, visited Oct. 14, 2013, 186 pages.

"Sentaurus Device" datasheet, Synopsys, Inc., Mountain View, CA, USA, Feb. 2007, 8 pages.

Martin-Bragado, Ignacio, et al., "Modeling charged defects, dopant diffusion and activation mechanisms for TCAD simulations using Kinetic Monte Carlo", Nuclear Instruments and Methods in Physics Research Sectin B: Beam Interactions with Materials and Atoms, 253:1, pp. 63-67, 2006, 18 pages.

Dunham, Scott T., "A Quantitative Model for the Coupled Diffusion of Phosphorus and Point Defects in Silicon", J. Electrochem. Soc., vol. 139, No. 9, (Sep. 1992), pp. 2628-2636.

Skinner, Richard D., editor, "Basic Integrated Circuit Manufacturing", section 2 of "Technology Reference Manual", ICE, Integrated Circuit Engineering, (1993), 112 pages.

Nagel, L.W., and D.O. Pederson, "Spice (Simulation Program with Integrated Circuit Emphasis)", Memorandum No. ERL-M382, Electronics Research Laboratory, College of engineering, University of California, Berkeley, CA USA, (Apr. 12, 1973), 65 pages.

Quarles, Thomas Linwood, "Analysis of Performance and Convergence Issues for Circuit Simulation", Memorandum No. UCB/ERL M89/42, Electronics Research Laboratory, College of Engineering, University of California, Berkeley, CA USA, (Apr. 1989), 142 pages.

Dunga, Mohan V., et al., "BSIM4.6.0 MOSFET Model—User's Manual", Department of Electrical Engineering and Computer Sciences, University of California, Berkeley, CA USA, 2006, 201 pages.

Burke, Kieron, and friends, "The ABC of DFT", Department of Chemistry, University of California, Irvine, CA, (Apr. 10, 2007), available at http://chem.ps.uci.edu/~kieron/dft/book, 104 pages.

Luisier, Mathieu, "Quantum Transport Beyond the Effective Mass Approximation", Diss. ETH No. 17016, 2007, 150 pages.

Taur, Y., "CMOS design near the limit of scaling", IBM J. Res. & Dev., vol. 46, No. 2/3, Mar./May 2002, pp. 213-212.

Luisier, Mathieu, "Quantum Transport for Engineers Lecture 4: Wave Function (WF) formalism and electrostatics", Integrated Systems Laboratory, ETH Zurich (2012), 34 pages.

Kim, Kyoung-Youm and Lee, Byoungho, "Quantum transport modeling in anisotropic semiconductors using Wigner function formulation", Proceedings Conference on Optoelectronic and Microelectronic Materials and Devices, COMMAD 2000. (2000), pp. 4.

Arovas, Daniel "Lecture Notes on Condensed Matter Physics, Chapter 1 Boltzmann Transport", Department of Physics, University of California, San Diego (2010), pp. 46.

(56) References Cited

OTHER PUBLICATIONS

Grau-Crespo, R. "Electronic structure and magnetic coupling in FeSbO4: A DFT study using hybrid functionals and GGA+U methods", Physical Review B 73, (2006), pp. 9.
Côté Michel, "Introduction to DFT+U", International Summer School on Numerical Methods for Correlated Systems in Condensed Matter, Université de Montréal, [Year], pp. 23.
Muramatsu, A., "Quantum Monte Carlo for lattice fermions", in: M.P. Nightingale, C.J. Umriga (Eds.), Proceedings of the NATO Advanced Study Institute on Quantum Monte Carlo Methods in Physics and Chemistry, Kluwer Academic Publishers, (1999), pp. 32.
Gross, E.K.U. and Maitra, N.T., "Introduction to TDDFT", Chapter in Fundamentals of Time-Dependent Density Functional Theory, Springer-Verlag (2012), 58 pages.
Marques, M.A.L. and Gross, E.K.U., "Time-dependent density functional theory," C. Fiolhais, F. Nogueira, M.A.L. Marques (Eds.), A Primer in Density Functional Theory, Springer Lecture Notes in Physics, vol. 620, Springer (2003), pp. 144-184.
Ryndyk, D.A., "Tight-binding model", Lectures 2006-2007, Dresden University of Technology, (2006-2007), pp. 26-30.
Bank, R.E., "Numerical Methods for Semiconductor Device Simulation", IEEE Transactions on Electron Devices, vol. ED-30, No. 9, (1983), pp. 1031-1041.
Lee, J.F., "Time-Domain Finite-Element Methods", IEEE Transactions on Antenna and Propagation, vol. 45, No. 3, (1997), pp. 430-442.
Eymard, R., "Finite Volume Methods", course at the University of Wroclaw, (2008), manuscript update of the preprint n0 97-19 du LATP, UMR 6632, Marseille, (Sep. 1997), Handbook of Numerical Anaylsis P.G. Ciarlet, J.L. Lions, eds. vol. 7, pp. 713-1020.
Chen, X.L., "An advanced 3D boundary element method for characterizations of composite materials", Engineering Analysis with Boundary Elements 29, (2005), pp. 513-523.
Marx, D., "Ab initio molecular dynamics: Theory and Implementation", Modern Methods and Algorithms of Quantum Chemistry, J. Grotendorst (Ed.), John von Neumann Institute for Computing, Julich, NIC Series, vol. 1, (2000), pp. 150.
PCT/US2014/057707—International Search Report and Wirtten Opinion dated Dec. 29, 2014, 16 pages.
PCT/US2014/057637—International Preliminary Report on Patentability, 7 pages.
U.S. Appl. No. 14/906,543—Office Acton dated Jun. 17, 2016, 26 pages.
PCT/US2014/057840—International Search Report dated Nov. 28, 2014, 9 pages.
U.S. Appl. No. 15/081,735—Office Action dated Jun. 15, 2016, 16 pages.
Saha et al., Technology CAD: Technology Modeling, Device Design and Simulation, 2004 VLSI Design Tutorial, Mubai, India, Jan. 5, 2004, 227 pages.
U.S. Appl. No. 14/497,681—Office Action dated Aug. 25, 2016, 20 pages.
Ayyadi et al., Semiconductor Simulations Using a Coupled Quantum Drift-Diffusion Schrodinger-Poisson Model, Aug. 12, 2004, Vienna University of Technology, pp. 1-19.
Kresse, G., et. al., VASP the Guide (Sep. 9, 2013), pp. 203.
U.S. Appl. No. 15/081,735—Office Action dated Dec. 13, 2016, 30 pages.
PCT/US2014/057840—International Preliminary Report on Patentability dated Mar. 29, 2016, 5 pages.
U.S. Appl. No. 15/081,735—Response to Office Action dated Jun. 15, 2016, filed Nov. 15, 2016, 18 pages.
PCT/US2014/057803—International Search Report and Written Opinion dated Nov. 28, 2014, 14 pages.
Martin-Bragado et al., "Modeling charged defects, dopant diffusion and activation mechanisms for TCAD simulations using Kinetic Monte Carlos," Nuclear Instruments and Methods in Physics Research Section B: Beam Interactions with Materials and Atoms, 253:1, 18 pages, Dec. 2006.
Nagel, Laurence W., "SPICE2: A Computer Program to Simulate Semiconductor Circuits", Memorandum No. UCB/ERL-M520, Electronics Research Laboratory, College of Engineering, University of California, Berkeley, CA USA, (May 9, 1975), 431 pages.
Synopsys, Sentaurus TCAD, Industry-Standard Process and Device Simulators, Datasheet (2012), 4 pages.
Yip, S. (ed.), Handbook of Materials Modeling, 565-588. c 2005 Springer.
U.S. Appl. No. 14/497,681—Response to Office Action dated Aug. 25, 2016, filed Jan. 24, 2017, 10 pages.
U.S. Appl. No. 14/906,543—Response to Office Action dated Jun. 17, 2016, filed Dec. 19, 2016, 12 pages.
U.S. Appl. No. 14/906,543—Final Office Action dated Feb. 10, 2017, 16 pages.
U.S. Appl. No. 14/906,543—Preliminary Amendment dated Jan. 20, 2016, 8 pages.
U.S. Appl. No. 15/081,735—Response to Office Action dated Dec. 13, 2016, filed Mar. 13, 2017, 10 pages.

Fig. 1 Transistor with Parallel Junctions

(Prior Art)

Fig. 2 Transistor with Curved Junctions

(Prior Art)

Fig. 3 FinFET Overview

(Prior Art)

Fig. 4 FinFET Cut Along Channel (Prior Art)

Fig. 5 "Noisy" Atomistic Junctions

Fig. 6 FinFET with Atomistic Doping

Fig. 7 FinFET Top View

Fig. 8 FinFET Cut Across Channel (Prior Art)

ESTIMATION OF EFFECTIVE CHANNEL LENGTH FOR FINFETS AND NANO-WIRES

CROSS-REFERENCE TO OTHER APPLICATIONS

This application is a National Phase filing under 35 U.S.C. 371 of International Application No. PCT/US2014/057637 filed on 26 Sep. 2014, which application claims the benefit under 35 U.S.C. 119(e) of the following U.S. provisional applications:

U.S. Application No. 61/883,158, filed 26 Sep. 2013;
U.S. Application No. 61/883,942, filed 27 Sep. 2013; and
U.S. Application No. 61/887,153, filed 4 Oct. 2013.

All the above applications are hereby incorporated by reference herein for their teachings.

BACKGROUND

It is desirable in many cases to have accurate estimate of the channel length for the short channel transistors like FinFETs and nano-wires. It is used to compare transistors to each other, to characterize the short channel effects, to characterize the direct source-to-drain tunneling, to model ballistic mobility, which is directly proportional to the channel length, etc. The gate length is easy to measure or extract from a geometry database, as it is defined by the gate patterning mask and subsequent deposition of the gate dielectric and the gate. However, the physical gate length is not a useful value for determining many critical characteristics of a transistor. More important is to know the effective channel length, which is defined as the average distance from source junction to drain junction. The effective channel length can be smaller than the gate length, same, or larger, depending on how transistor is built. Current practice is for engineers to take a close look at the transistor and estimate its effective channel length based on a number of factors. It is desirable to have an algorithm that can reliably determine the effective channel length and exclude human errors and human-to-human variation due to the different "eye-balling" approaches.

SUMMARY

According to the invention, instead of direct measurement of the effective channel length, roughly described, the effective channel length for the FinFETs and nano-wires with arbitrary junction shapes is determined automatically based on integrated values such as area and volume and therefore is robust and insensitive to fluctuations in geometry and doping. Roughly described, the effective channel length of a 3D transistor having a gate length below 20 nm involves estimating an effective volume of the channel and a cross-sectional area of the channel, and estimating the effective channel length as the ratio of effective volume to cross-sectional area. Preferably the effective volume is estimated as the sum of a plurality of sub-volumes within containing boundaries of the channel, excluding those sub-volumes having a dopant concentration above the source/drain dopant concentration at the carrier injection point. The containing boundaries can be identified using geometry data describing the transistor, particularly the data identifying inner surfaces of the gate dielectric. The estimated effective channel length can be used in TCAD level analysis of the transistor and calculating characteristics of the transistor as needed for circuit simulation.

The algorithm can be applied either to continuum doping profiles that are defined in terms of concentrations at each point in space, or to atomistic representation of the doping atoms, which can be preferred when transistors are scaled such that only a few atoms determine their behavior. In an embodiment, the algorithm handles both doped channels and undoped channels by using the concept of threshold source/drain doping level that is independent of the channel doping. Atomistic representation of the source/drain doping often exhibits non-contiguous, "spotty" dopant distributions, which are especially difficult to evaluate by eye-balling the structure. However, the concept of "effective channel volume" easily handles it. The invention is most beneficial for three-dimensional transistor bodies such as FinFETs, dual and tri-gate transistors and nanowires. Aspects of this approach can be applied to any three-dimensional transistor with tight gate control, including transistor bodies made up of 2-dimensional channel materials such as graphene, BN, MoS2, WSe2, and including carbon nano-tubes.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

During the development and advancement of fabrication processes, as well as at other times, new transistor structures are developed. The new structures can differ from prior structures in many ways, such as by channel material, doping materials and profiles, scaling, gate and gate dielectric materials, source/drain shapes and so on. They can also differ in more fundamental ways, such as the ways in which FinFETs, dual and tri-gate transistors, nanowires, SOI transistors, ultra-thin body transistors, 2-dimensional channel transistors and carbon nano-tubes differ from conventional planar transistors. Before these transistors are put into production, they are analyzed to determine their circuit level parameters such as their I-V curves, threshold voltage Vth, electron and hole mobility, leakage currents, output resistance, capacitance, small signal characteristics, and so on. These parameters are used to compare transistor structures to others, as well as being provided to circuit simulators so that circuits that use such transistors can be modeled.

Figure 1:
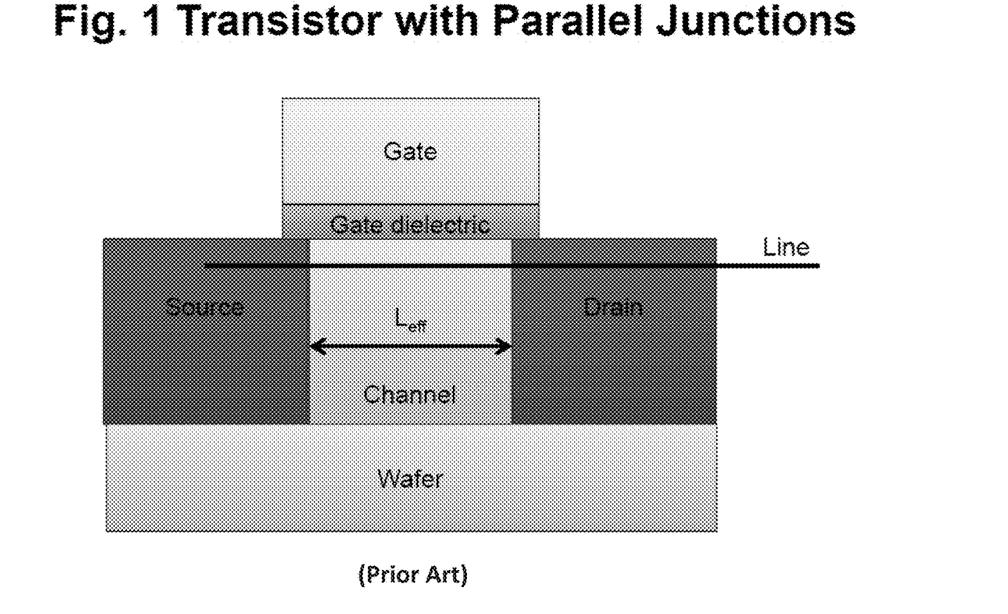
FIG. 1 is an idealized drawing of a planar MOSFET transistor.

Conventionally, effective channel length Leff is extracted from a geometric model of a transistor by drawing a line parallel to the current flow somewhere inside the channel and determining intersections of that line with the source junction and the drain junction. This works fine if the source junction is flat and is parallel to the drain junction, as is shown on FIG. 1. This approach is not completely automatic, as it typically requires the human to choose where to draw the line.

Figure 2:
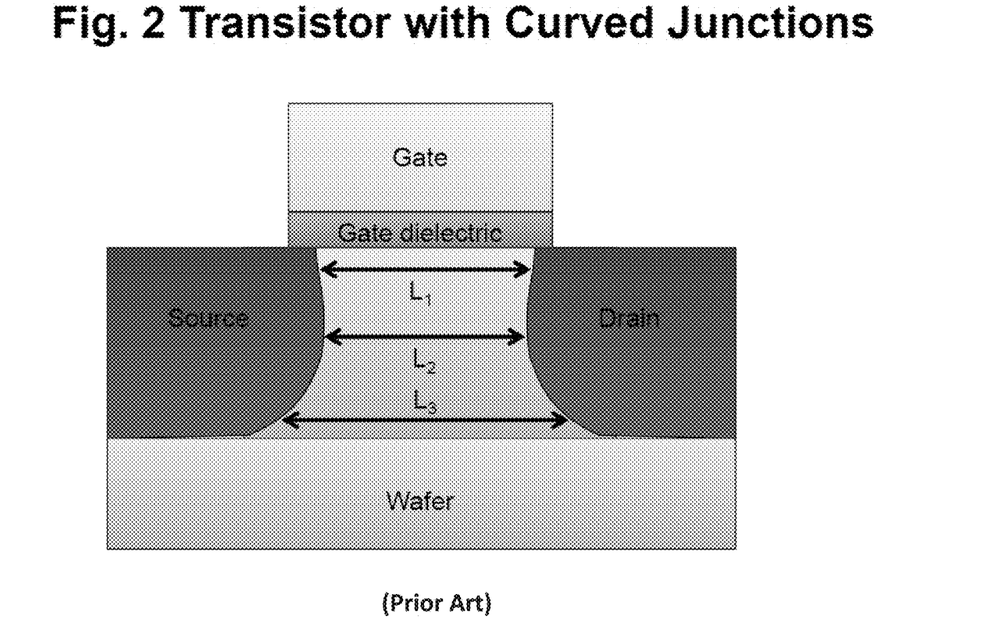
FIG. 2 is a drawing of a planar MOSFET transistor with curved junctions.

However, the junctions are usually curved, as illustrated on FIG. 2. Depending on where the line is drawn, the effective channel length is different. In a planar MOSFET, typically the line is drawn close to the gate dielectric, where most of the current is flowing, giving effective channel length of $L_1$. The $L_2$ and $L_3$ values typically are ignored, as there is no significant current flow.

Figure 3:
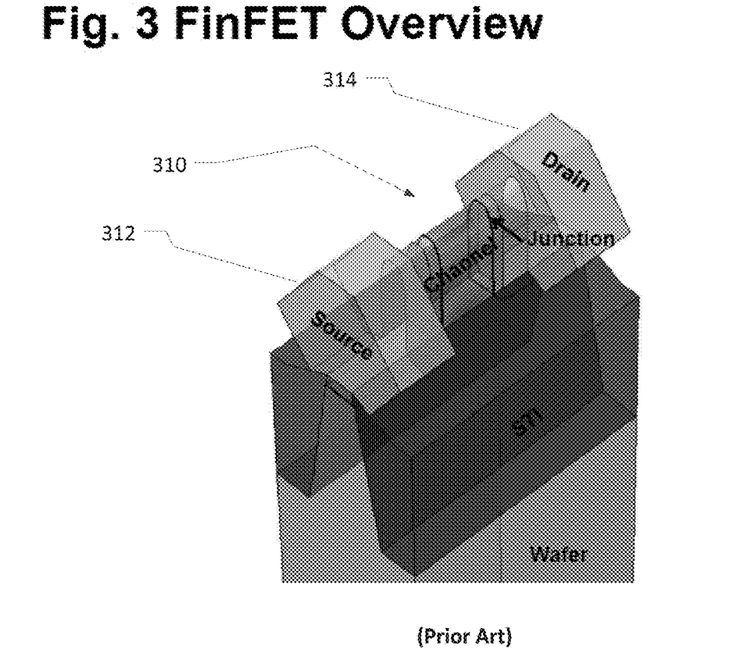
FIG. 3 is a perspective view of a model of a FinFET.
Figure 4:
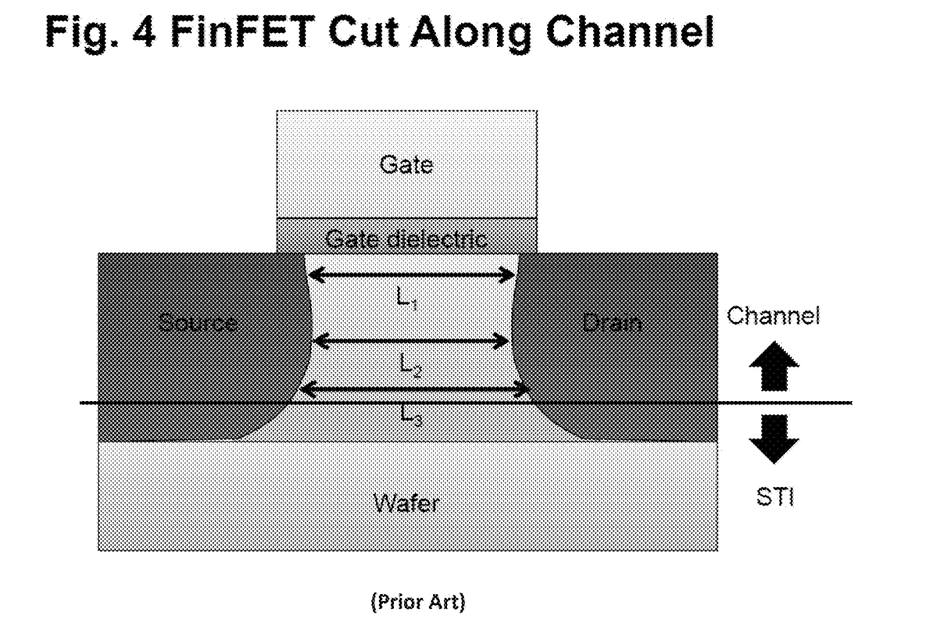
FIG. 4 is a drawing of a FinFET transistor with curved junctions.

For FinFETs and nano-wire transistors, current is flowing throughout the entire channel, so the simple approach that works for the planar MOSFET is no longer valid. Typical FinFET geometry is depicted in FIG. 3. It includes a channel region 310, and source and drain regions 312, 314 on opposite ends of the channel region longitudinally. The channel ideally is a body of undoped silicon, and the source and drain regions are doped with dopant atoms. FinFET cross-section along the channel is shown on FIG. 4, with the current flowing throughout the entire channel. Here, all possible effective channel length measurements are meaningful, including $L_1$, $L_2$, and $L_3$. The overall effective channel length can be determined by taking multiple measurements that equally represent all parts of the channel and averaging them. This is possible to accomplish with the conventional approach, although it becomes laborious.

Figure 5:
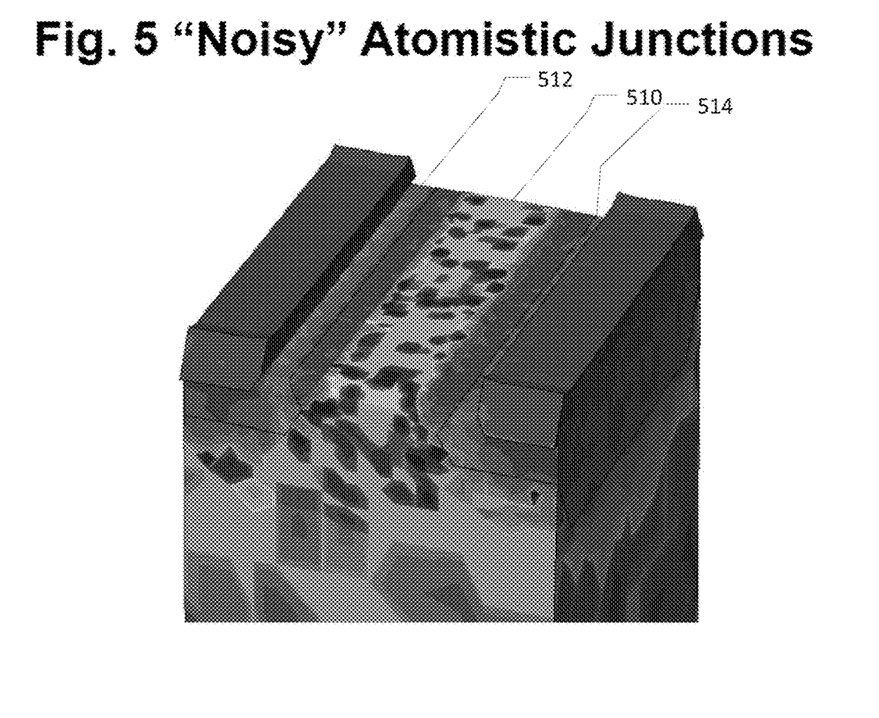
FIG. 5 illustrates a planar MOSFET with an atomistic view of doping in the source, channel, and drain.
Figure 6:
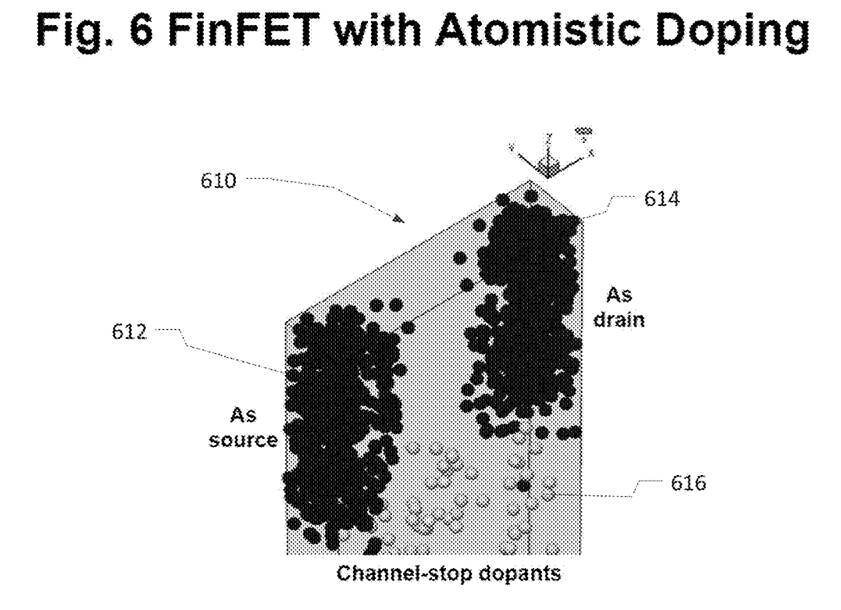
FIG. 6 depicts a FinFET with atomistic doping in the source, drain, and channel-stop region below the channel.

As the transistor sizes keep shrinking with each subsequent technology node, they contain fewer and fewer lattice atoms, approximately 3 times less with each generation. This means that specific locations of separate doping atoms can determine a transistor's behavior. FIG. 5 illustrates a planar MOSFET with an atomistic view of doping in the source 512, channel 510, and drain 514. FIG. 6 depicts a FinFET with atomistic doping in the channel 610, source 612, drain 614, and channel-stop region 616 below the channel. The source/drain dopants in FIG. 6 are As atoms (dark circles), and the channel-stop dopants are shown as light circles. The channel is undoped silicon in this image, except for unintended dopant atoms randomly diffusing into the channel either from the source or from the drain or from the channel-stop region.

Figure 7:
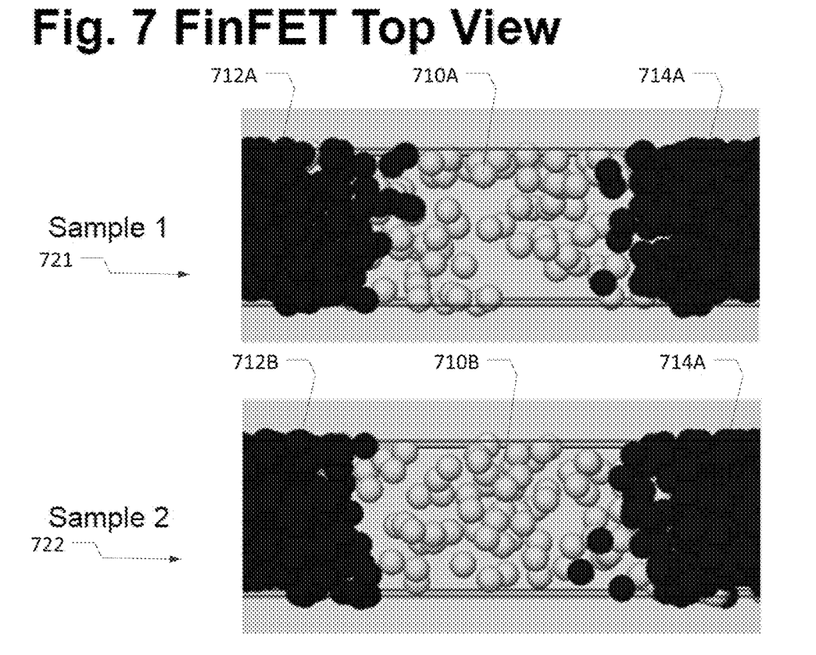
FIG. 7 depicts top views of two FinFET samples with different randomized atomistic doping distributions.

FIG. 7 shows top view of two FinFET samples 721 and 722 with different randomized atomistic dopant distributions. In sample 721 the channel, source and drain are indicated as 710A, 712A and 714A, respectively. In sample 722 the channel, source and drain are indicated as 710B, 712B and 714B, respectively. The conventional approach breaks down for atomistic doping, because the measuring lines randomly bump into the atoms and give inaccurate results.

Figure 9:
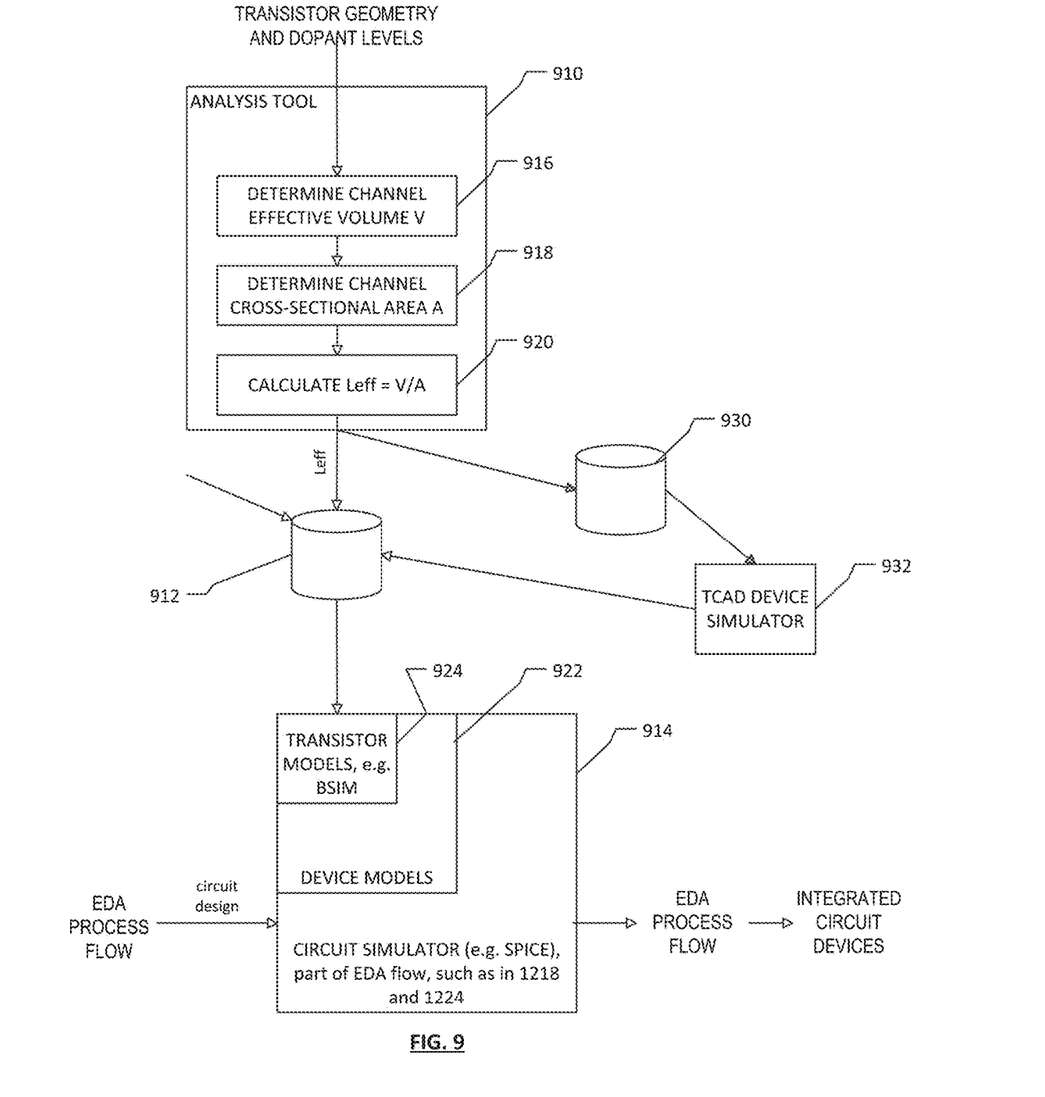
FIG. 9 illustrates modules in a system according to the invention.

FIG. 9 shows a system which can resolve the issues of curved and spotty junctions and also eliminate any need for the human to choose where to draw the measuring lines and therefore make it completely automatic. In the illustrated embodiment, the system is organized as an analysis tool 910 which generates a set of parameters including the effective gate length Leff, which are then written to a database 912 and used for simulating electrical behavior of the transistor in a circuit. The tool can execute a process that accepts a transistor specification as input, where the transistor specification includes transistor geometry and dopant distribution or distributions. Using the transistor specification, the process can generate parameters such as Leff.

The database 912 typically contains model information for a large number of components offered to designers for the particular fabrication process, including several different types of transistors. The model information for each component is made available to circuit simulators such as a SPICE tool 914, for use in simulating the electrical performance of an input circuit design.

The calculated value of Leff can be used additionally or instead for other purposes. For example, it can be written into a memory region or database 930, and retrieved by a TCAD device simulator 932 for detailed TCAD level analysis of the transistor. An accurate value of Leff is useful for example to provide yet more parameter values for a transistor model in a circuit simulator. The calculated value for Leff can be used, for example, in the ballistic mobility model. A tool which performs such TCAD level analysis is Sentaurus Device, available from Synopsys, Inc., and described in Synopsys, Sentaurus Device, Datasheet (2007), incorporated by reference herein and available at http://www.synopsys.com/Tools/TCAD/CapsuleModule/sde-vice_ds.pdf (visited 2013 Oct. 3). Transistor parameters output by the TCAD device simulator 932 can, like Leff itself, be written into the database 912 for use in transistor models by a circuit simulator 914.

The databases 912 and 930 are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus in FIG. 9, the databases 912 and 930 are also sometimes referred to herein in combination as "a database".

Analysis Tool

The analysis tool 910 has stored accessibly thereto, a data set stored in one or more files in a non-transitory computer readable medium. The computer readable medium may be a stand-alone component or may be part of one or more other computer systems. Alternatively, the data set may be provided in the form of a data stream. The data set describes, among other things, the geometry and dopant profile of the transistor to be analyzed. Preferably the data set is provided to the tool in a predetermined data interchange format, such as is generated by TCAD. Preferably the format uses a 3D mesh to organize the data set, in which each node indicates among other things the material and the doping level at that position in the structure. More specifically, each node of the mesh has node information associated with it, which indicates among other things the material and dopant concentrations within a volume that contains the node. For example, in the FinFET of FIG. 3, a 3D grid (not shown) is imposed on the structure, with each node of the grid identifying information about the Voronoi volume that contains the node. In the illustrations of FIGS. 3, 6 and 7, for example, an undoped volume in the channel is indicated at the corresponding node as containing pure silicon. A volume in the source or drain region is indicated as containing silicon with a high concentration of source/drain dopant atoms (arsenic in FIGS. 6 and 7). Volumes containing gate dielectric (not shown), are indicated as containing oxide. By comparing the oxide content of volumes with neighboring volumes, it is possible to determine the surface interface of the channel with the surrounding gate dielectric. Note that the mesh need not be uniform. Additionally, the length of the gate oxide in the transistor longitudinal dimension as reflected in the data set is one of several ways in which the data set indicates what the gate length is of the transistor.

The analysis tool 910 can be invoked using an application program interface (API), in which a script or other software program, running on a computer system, invokes the tool 910 and identifies the input data to it. In one embodiment the transistor information is specified to the program by a user identifying, through a command line or through a graphical user interface (GUI), a file that contains the input data. In one embodiment the file that contains the input data may be generated by a fabrication process simulator, such as Sentaurus Process, available from Synopsys, Inc., from detailed information about the fabrication process to be used to fabricate the transistor. In an embodiment the fabrication process simulator operates according to any of the techniques described in U.S. patent application Ser. No. 14/479,070, filed 5 Sep. 2014, incorporated by reference herein.

The analysis tool 910 generates as output the effective channel length Leff of the input transistor structure. It may also generate other transistor parameters as output. In one embodiment the output is returned to the caller of the API, which can display the output to a user, or write it to the database 912, or provide it as input through another API to the circuit simulator 914. In another embodiment any of these dispositions of the output can be performed by the analysis tool 912 itself.

The operation performed by the analysis tool includes the calculation of Leff from the transistor input data. Referring to FIG. 9, the calculation involves determining an effective volume V of the channel (step 916), determining a cross-sectional area A for the channel (step 918), and calculating Leff=V/A (step 920). In all flowcharts herein, the logic of the flow chart can be implemented using processors programmed using computer programs stored in memory accessible to the computer systems and executable by the processors, by dedicated logic hardware, including field programmable integrated circuits, or by combinations of dedicated logic hardware and computer programs. Each block in the flowchart describes logic that can be implemented in hardware or in software running on one or more computing processes executing on one or more computer systems as described herein. In one embodiment, each step of the flow chart illustrates the function of a separate module of software. In another embodiment, the logic of the step is performed by software code routines which are distributed throughout more than one module. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that in a specific embodiment, numerous additional steps for accomplishing other functions for that embodiment can be performed before, after and between those steps shown.

Figure 10:
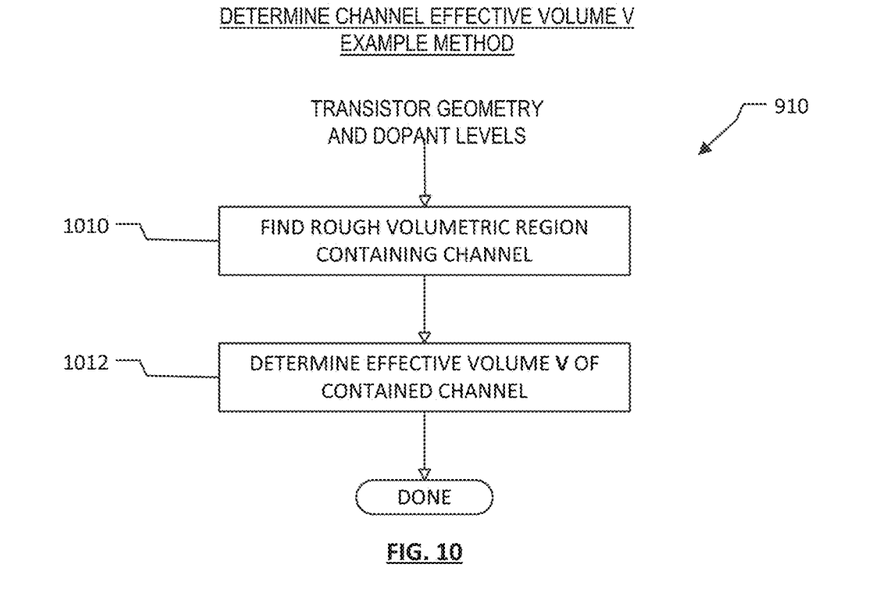
FIG. 10 is an example flow chart detail of the module in FIG. 9 for determining channel effective volume V.

FIG. 10 illustrates an example method for determining the channel effective volume V. In step 1010, the geometric data modeling the transistor geometry is analyzed to find a rough volumetric region that contains the channel. It is preferable to err on the large size so as to include at least the entire actual channel. FinFETs (including dual gate and tri-gate versions), nano-wire transistors, gate-all-around transistors, and 2-dimensional transistors with graphene, BN, MoS2, or WSe2, all include in the transistor structure a thin gate dielectric surrounding the channel. Therefore, to find a rough volumetric region containing the channel in these types of transistors, an embodiment can find the thin gate dielectric, and identify the volume inside whose surfaces are interfaces to this dielectric. More specifically, the following sub-method can be used:

1. Find the minimum EOT (Equivalent Oxide Thickness) in the structure. This can be determined by surveying the geometry data to find surfaces where oxide meets other materials. Since the geometry data i preferably not idealized, but rather is generated by a TCAD simulation of a series of fabrication process steps, it will be appreciated that the surfaces will not be simple planes.

2. Find all adjacent semiconductor surface where EOT does not exceed the minimum EOT plus some predetermined margin. It is possible that because of the non-ideal fabrication process, the minimum EOT may be smaller than an idealized thickness, for example in corners or at the edges of layers. The margin is chosen to be large enough to capture most or all of the gate dielectric, though thicker than the minimum. The margin is chosen also to be small enough to ensure that oxide regions which are contained in the structure for other reasons are excluded. For example the margin can be 20% of the minimum EOT.

Figure 8:
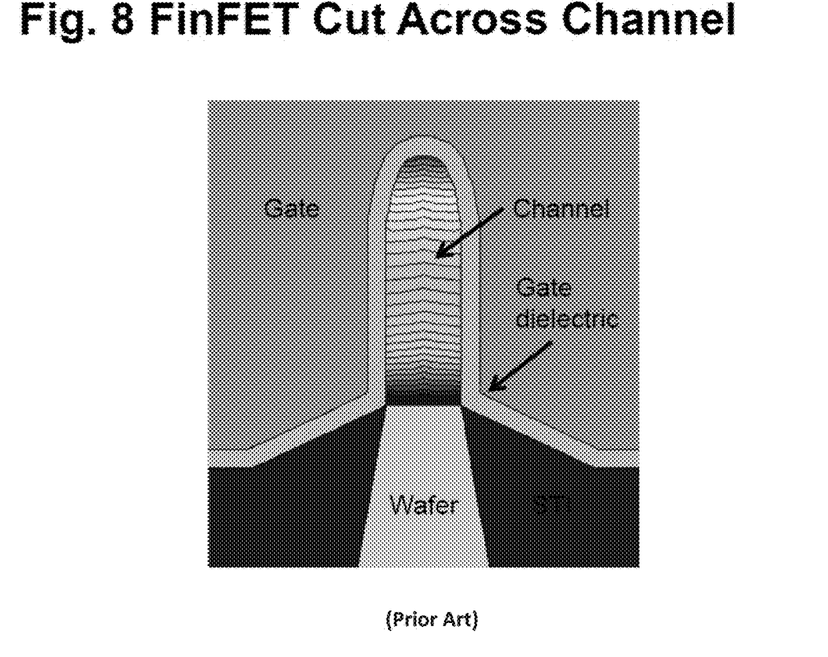
FIG. 8 depicts a cross-cut view of the FinFET of FIG. 3.

3. The obtained surface sheathes the channel, leaving open the source side and the drain side. For bulk FinFETs, it also leaves open the bottom surface of the channel—see, for example, FIG. 8. The system completes the bottom surface by a plane that is parallel to the main (longitudinal) axis of the channel (see step 1110 in FIG. 11), and the source and drain ends of the channel are completed by planes that are perpendicular to the main axis of the channel.

The volumetric region bounded by the surfaces found in step 1010 is only a rough enclosure of the effective channel, which as previously mentioned typically does not have flat surfaces. The boundaries of this rough enclosure are sometimes referred to herein as "containing boundaries" of the channel.

In step 1012 the effective volume V of the contained effective channel is calculated. This can be accomplished by calculating the sum of Voronoi volumes of all the mesh nodes in the volumetric region determined in step 1010, for only those of the nodes whose doping level is below a predetermined value C*. C* is chosen as a source/drain dopant concentration at the interface between channel and source or drain. Preferably C* is equal to the source/drain dopant concentration at the carrier injection point. Preferably C*=2e19 cm$^{-3}$, per Taur, Y., CMOS design near the limit of scaling, IBM J. RES. & DEV., Vol. 46 No. 2/3, pp.

213-222 (2002), incorporated by reference herein. For spotty atomistic doping, choosing a threshold like C* will omit volumes having source/drain dopants that have trickled into the channel, but will count all adjacent volume around such dopants, which is the desired behavior.

It will be appreciated that one of the purposes of finding containing boundaries of the channel is to ensure that the summation of Voronoi volumes in step 1012 covers at least the effective volume of the channel, but excludes regions of the structure which are isolated from the effective volume of the channel but which the dopant concentration criterion might fail to exclude by itself. Other methods to find appropriate containing boundaries that will accomplish this purpose will be apparent to the reader.

Figure 11:
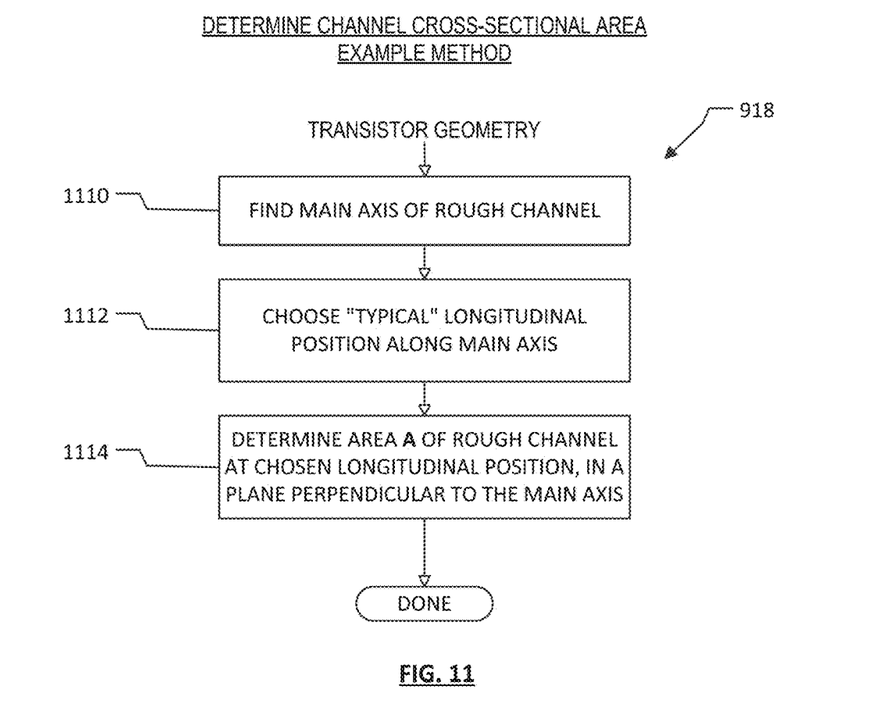
FIG. 11 is an example flow chart detail of the module in FIG. 9 for determining channel cross-sectional area.

FIG. 11 illustrates an example method for determining channel cross-sectional area. It involves, in step 1110, finding the main axis of the rough volumetric region found in step 1010. To ensure electrostatic integrity of the transistor, its channel length should be considerably larger than its channel width. Therefore, the longer dimension of the volume determined in step 1010 defines the main axis of the channel, the direction of the current flow.

In step 1112, a longitudinal position along the main axis is chosen which is deemed to have a cross-sectional area that is "typical" for the channel. For a typical device, in which the channel has a roughly constant width and depth along at least the longitudinally central portion of its length, a good position to choose is the centroid of the volumetric region from step 1010. Thus, this step can involve calculating the coordinates of the centroid of the volumetric region from step 1010.

Next, in step 1114, the cross-sectional area A of the rough channel volume from step 1110 is calculated, at the longitudinal position from step 1112. This can involve determining the plane passing through the centroid and perpendicular to the main axis, and calculating the area of that plane. Note that if the channel width or height varies along its length, then an embodiment can calculate the cross-sectional area at several longitudinal positions along the channel main axis, and average them to determine A.

As mentioned, once values have been obtained for V and A, the effective channel length can be calculated as Leff=V/A.

Circuit Simulator

Circuit simulators are well known. Examples of such tools are different versions of SPICE, described in the following documents incorporated by reference herein: Nagel and Pederson, SPICE (Simulation Program with Integrated Circuit Emphasis), EECS Department, University of California, Berkeley (1973) (available at http://www.eecs.Berkeley.edu/Pubs/TechRpts/1973/ERL-382.pdf, visited 2013 Oct. 2); Nagel, Laurence W., SPICE2: A Computer Program to Simulate Semiconductor Circuits, EECS Department, University of California, Berkeley (1975) (available at http://www.eecs.berkeley.edu/Pubs/TechRpts/1975/ERL-520.pdf, visited 2013 Oct. 2); and Quarles, Thomas L., Analysis of Performance and Convergence Issues for Circuit Simulation, EECS Department, University of California, Berkeley (1989) (available at http://www.eecs.berkeley.edu/Pubs/TechRpts/1989/ERL-89-42.pdf, visited 2013 Oct. 2), all incorporated by reference herein. Roughly described, a circuit simulator takes a circuit design as input (typically in the form of a netlist, indicating each component of the circuit and the network by which they are interconnected), and calculates a variety of kinds of information about the circuit. In the embodiment of FIG. 9, the circuit simulator 914 is used for example in steps 1218 and/or 1224 of the typical EDA flow in FIG. 12 discussed hereinafter.

Circuit simulators such as SPICE include device models 922, which model the behavior of the various components that are used in a circuit. One example device model which is commonly used for transistors, is the Berkeley Short-channel IGFET Model (BSIM) family of models. The BSIM4 version of the model is described for example in Mohan V. Dunga et. al., BSIM4.6.0 MOSFET Model User's Manual, Department of Electrical Engineering and Computer Sciences, University of California, Berkeley (2006), incorporated by reference herein. It can be seen that the model uses Leff in the calculation of a large number of transistor parameters, including:

the calculation of I-V profiles;
Vth change due to SCE and DIBL
drain current Ids in the subthreshold region
mobility
saturation voltage Vdsat
the Early voltage due to substrate current
transient currents iD(t), iG(t) and iS(t)
flicker noise
and many others.

In all the equations, BSIM uses a geometrical approximation of Leff, which does not necessarily correspond to a true effective channel length. In an embodiment, the value for Leff calculated by the analysis tool 910 is provided to the BSIM model which then uses it in place of its own geometrical approximation.

Design Process Flow

Figure 12:
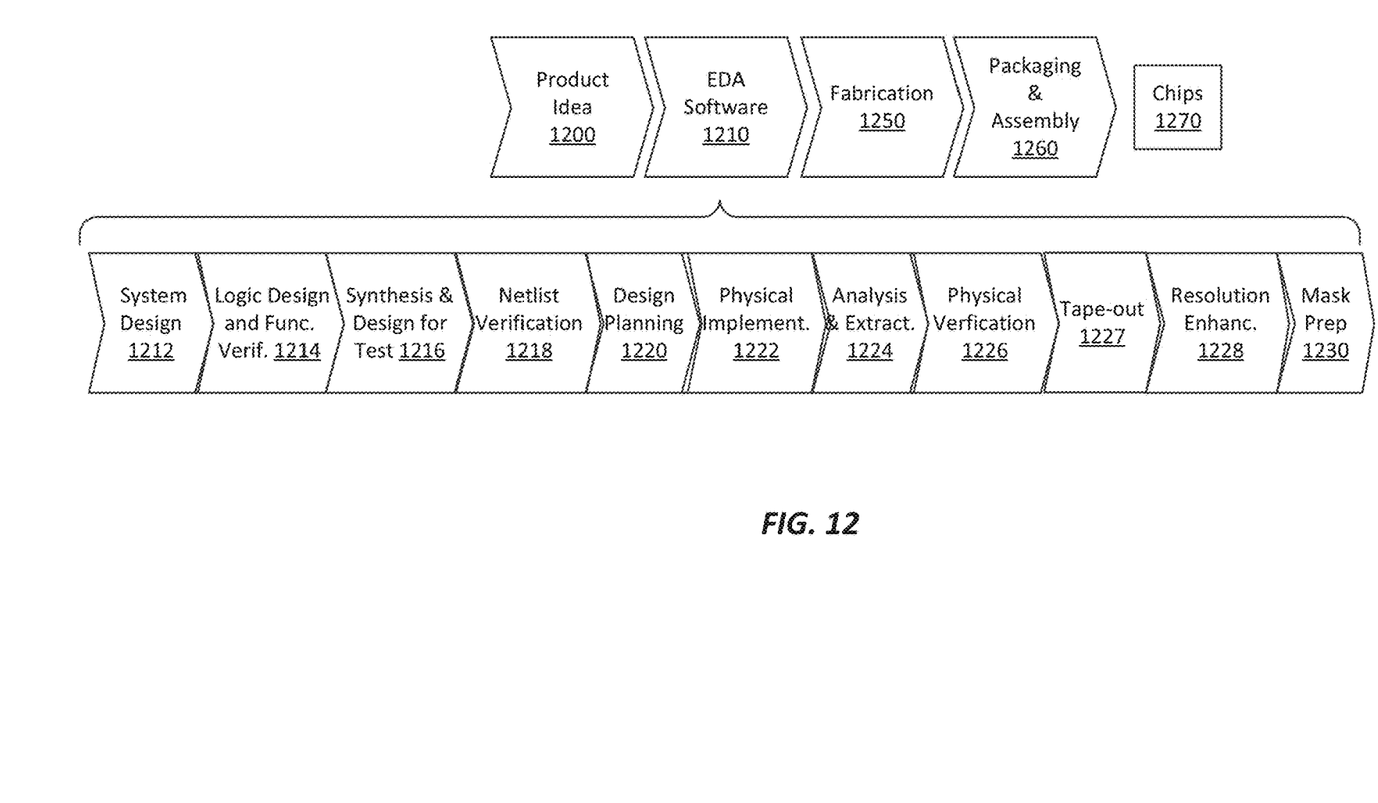
FIG. 12 depicts a simplified representation of an illustrative digital integrated circuit design flow.

As mentioned, the circuit simulator 914 (FIG. 9) can be used as part of an overall EDA design process flow. FIG. 12 shows a simplified representation of an illustrative digital integrated circuit design flow. At a high level, the process starts with the product idea (step 1200) and is realized in an EDA (Electronic Design Automation) software design process (step 1210). When the design is finalized, it can be taped-out (step 1227). At some point after tape out, the fabrication process (step 1250) and packaging and assembly processes (step 1260) occur resulting, ultimately, in finished integrated circuit chips (result 1270). An example physical fabrication flow is described in Integrated Circuit Engineering Corp., Basic Integrated Circuit Technology Reference Manual, Section 2, Basic Integrated Circuit Manufacturing, pp. 2-1 through 2-112 (1993) incorporated by reference herein.

The EDA software design process (step 1210) is itself composed of a number of steps 1212-1230, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (step 1210) will now be provided.

System design (step 1212): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification (step 1214): At this stage, the VHDL or Verilog code for modules in the system is written and the design is checked for functional accuracy. More specifically, the design is checked to ensure that it produces correct outputs in response to particular input stimuli. Example EDA software products from Synopsys, Inc. that can be used at this step include VCS, VERA, DesignWare®, Magellan, Formality, ESP and LEDA products.

Synthesis and design for test (step 1216): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, DFT Compiler, Power Compiler, FPGA Compiler, TetraMAX, and DesignWare® products.

Netlist verification (step 1218): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 1220): Here, an overall floor plan for the chip is constructed and analyzed for timing and top-level routing. Example EDA software products from Synopsys, Inc. that can be used at this step include Astro and Custom Designer products.

Physical implementation (step 1222): The placement (positioning of circuit elements) and routing (connection of the same) occurs at this step, as can selection of library cells to perform specified logic functions. Example EDA software products from Synopsys, Inc. that can be used at this step include the Astro, IC Compiler, and Custom Designer products.

Analysis and extraction (step 1224): At this step, the circuit function is verified at a transistor level, this in turn permits what-if refinement. Example EDA software products from Synopsys, Inc. that can be used at this step include AstroRail, PrimeRail, PrimeTime, and Star-RCXT products.

Physical verification (step 1226): At this step various checking functions are performed to ensure correctness for: manufacturing, electrical issues, lithographic issues, and circuitry. Example EDA software products from Synopsys, Inc. that can be used at this step include the Hercules product.

Tape-out (step 1227): This step provides the "tape out" data to be used (after lithographic enhancements are applied if appropriate) for production of masks for lithographic use to produce finished chips. Example EDA software products from Synopsys, Inc. that can be used at this step include the IC Compiler and Custom Designer families of products.

Resolution enhancement (step 1228): This step involves geometric manipulations of the layout to improve manufacturability of the design. Example EDA software products from Synopsys, Inc. that can be used at this step include Proteus, ProteusAF, and PSMGen products.

Mask data preparation (step 1230): This step provides mask-making-ready "tape-out" data for production of masks for lithographic use to produce finished chips. Example EDA software products from Synopsys, Inc. that can be used at this step include the CATS® family of products.

Parallel Flow.

The integrated circuit manufacturing flow includes a parallel flow, as follows:

(1) Develop individual process steps for manufacturing the integrated circuit. This can be modeled with EDA tools such as the Synopsys tools "Sentaurus Process", "Sentaurus Topography", and "Sentaurus Lithography". The input information here includes process conditions like temperature, reactor ambient, implant energy, etc. The output information includes the change in geometry or doping profiles or stress distribution.

(2) Integrate the individual process steps into the complete process flow. This can be modeled with EDA tools such as the Synopsys tool "Sentaurus Process". The input information here includes the collection of the process steps in the appropriate sequence. The output includes the geometry, the doping profiles, and the stress distribution for the transistors and the space in between the transistors.

(3) Analyze performance of the transistor manufactured with this process flow. This can be done with EDA tools such as the Synopsys tool "Sentaurus Device". The input information here includes the output of step (2) and the biases applied to transistor terminals. The output information includes the currents and capacitances for each bias combination. Aspects of the invention can be used for example in this step.

(4) If necessary, modify the process steps and the process flow to achieve the desired transistor performance. This can be done iteratively by using tools such as the Synopsys tools mentioned above.

Once the process flow is ready, it can be used for manufacturing multiple circuit designs. The EDA flow 1212-1230 will be used for this purpose. The parallel flow described here typically is used at a foundry to develop a process flow that can be used to manufacture designs. A combination of the process flow and the masks 1230 are used to manufacture any particular circuit. If the integrated circuit is manufactured at an IDM (integrated device manufacturer) company instead of the combination of a fables company and a foundry, then both parallel flows described above are done at the same IDM company.

Hardware Implementation

Figure 13:
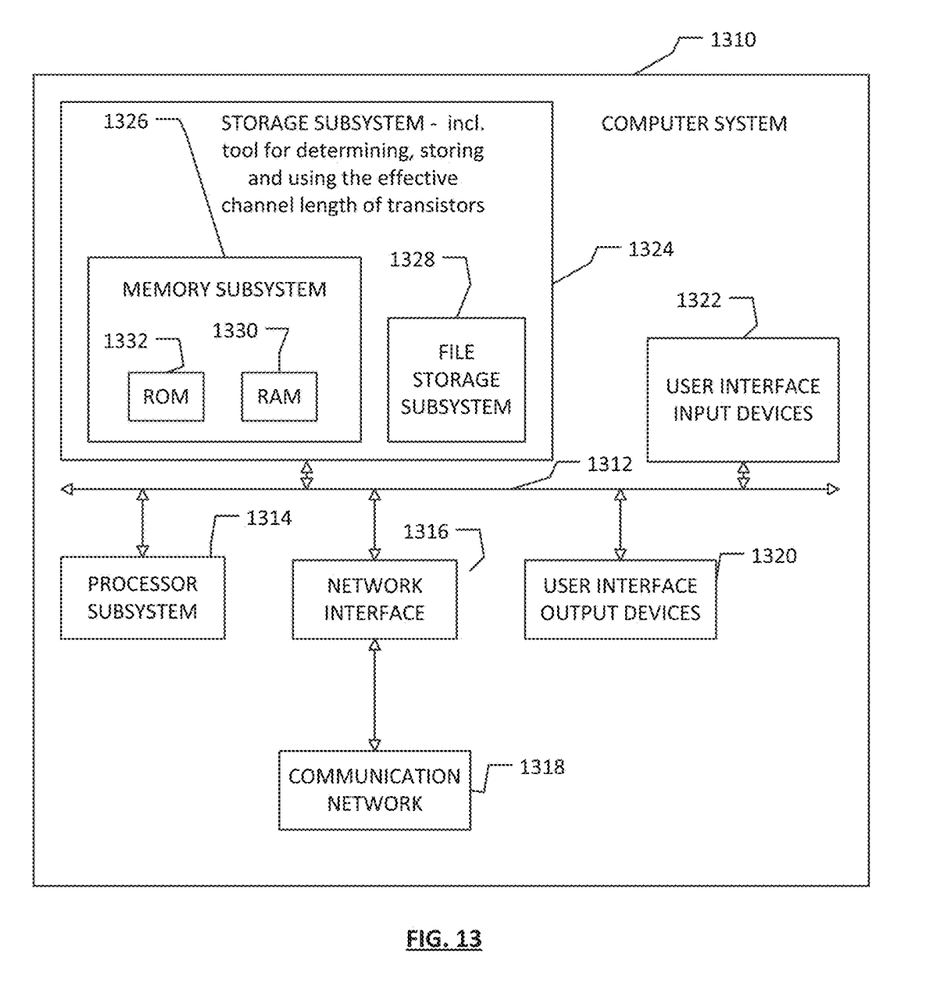
FIG. 13 is a simplified block diagram of a computer system that can be used to implement aspects of the invention.

FIG. 13 is a simplified block diagram of a computer system 1310 that can be used to implement any of the methods and processes herein.

Computer system 1310 typically includes a processor subsystem 1314 which communicates with a number of peripheral devices via bus subsystem 1312. These peripheral devices may include a storage subsystem 1324, comprising a memory subsystem 1326 and a file storage subsystem 1328, user interface input devices 1322, user interface output devices 1320, and a network interface subsystem 1316. The input and output devices allow user interaction with computer system 1310. Network interface subsystem 1316 provides an interface to outside networks, including an interface to communication network 1318, and is coupled via communication network 1318 to corresponding interface devices in other computer systems. Communication network 1318 may comprise many interconnected computer systems and communication links. These communication links may be wireline links, optical links, wireless links, or any other mechanisms for communication of information, but typically it is an IP-based communication network. While in one embodiment, communication network 1318 is the Internet, in other embodiments, communication network 1318 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1322 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1310 or onto computer network 1318.

User interface output devices 1320 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 1310 to the user or to another machine or computer system.

Storage subsystem 1324 stores the basic programming and data constructs that provide the functionality of certain embodiments of the present invention. For example, the various modules implementing the functionality of certain embodiments of the invention may be stored in storage subsystem 1324. In particular, software code modules implementing the various flow chart steps described herein may be stored in storage subsystem 1324. These software modules are generally executed by processor subsystem 1314. The database 912 also may be stored in the storage subsystem 1324.

Memory subsystem 1326 typically includes a number of memories including a main random access memory (RAM) 1330 for storage of instructions and data during program execution and a read only memory (ROM) 1332 in which fixed instructions are stored. File storage subsystem 1328 includes persistent non-transitory memory storing computer programs, databases and other resources to configure the data processing systems as tool for determining the effective channel length of transistors, and for storing the results, and for making use of the results in circuit simulations, and for performing many other steps in the EDA process. The tool can include an API configured to use input parameter sets (such as those identifying a transistor structure and doping profile), and to perform the procedures of the tool using the input parameter sets. The file storage subsystem 1328 may include for example a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1328. The host memory 1326 contains, among other things, computer instructions which, when executed by the processor subsystem 1314, cause the computer system to operate or perform functions as described herein. As used herein, processes and software that are said to run in or on "the host" or "the computer", execute on the processor subsystem 1314 in response to computer instructions and data in the host memory subsystem 1326 including any other local or remote storage for such instructions and data.

Bus subsystem 1312 provides a mechanism for letting the various components and subsystems of computer system 1310 communicate with each other as intended. Although bus subsystem 1312 is shown schematically as a single bus, alternative embodiments of the bus subsystem may use multiple busses.

Computer system 1310 itself can be of varying types including a personal computer, a portable computer, a workstation, a computer terminal, a network computer, a television, a mainframe, a server farm, or any other data processing system or user device. Due to the ever changing nature of computers and networks, the description of computer system 1310 depicted in FIG. 13 is intended only as a specific example for purposes of illustrating the preferred embodiments of the present invention. Many other configurations of computer system 1310 are possible having more or less components than the computer system depicted in FIG. 13.

In addition, while the present invention has been described in the context of a fully functioning data processing system, those of ordinary skill in the art will appreciate that the processes herein are capable of being distributed in the form of a computer readable medium of instructions and data and that the invention applies equally regardless of the particular type of signal bearing media actually used to carry out the distribution. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated.

We claim:

1. A system for enhancing simulations of three-dimensional transistors, the system comprising:
   a data processor;
   a source of a data set for the data processor, the data set describing a dopant profile of a three-dimensional transistor having a semiconductor body, the data set also identifying a gate length for the transistor which is no greater than 20 nm, the data set further identifying surfaces of gate dielectric material adjacent to the semiconductor body, the data set further describing source/drain dopant concentration within each of a plurality of sub-volumes within the semiconductor body; and
   a computer readable medium coupled to the data processor, the computer readable medium having stored thereon in a non-transitory manner a plurality of software code portions defining logic for:
      identifying containing boundaries of the channel in dependence upon the surfaces of gate dielectric material adjacent to the semiconductor body as identified in the data set,
      estimating an effective volume V of the channel of the transistor in dependence upon the dopant profile within the containing boundaries as described in the data set, including summing all of the sub-volumes which are within the containing boundaries and whose source/drain dopant concentration is below a predetermined value,
      determining a cross-sectional area A of the channel of the transistor,
      estimating the effective channel length of the transistor as the ratio of V to A, and
      providing the estimated effective channel length for simulation of an aspect of the three-dimensional transistor.

2. The system of claim 1, wherein the predetermined value is the source/drain dopant concentration at a carrier injection point at an interface of channel and a member of the group consisting of source and drain.

3. The system of claim 1, wherein the source/drain dopant concentration of at least one of the sub-volumes which are within the containing boundaries, exceeds the predetermined value.

4. The system of claim 1, wherein determining a cross-sectional area A of the channel of the transistor comprises:
   choosing a particular longitudinal position along the channel; and
   calculating a cross-sectional area of the channel at the particular longitudinal position in dependence upon the surfaces of gate dielectric material identified in the data set.

5. The system of claim 4, wherein the particular longitudinal position is the centroid of a volumetric region determined by identifying containing boundaries of the channel in dependence upon the surfaces of gate dielectric material adjacent to the semiconductor body as identified in the data set.

6. The system of any of claim 1, wherein the plurality of software code portions further define logic for writing the effective channel length into a database.

7. The system of any of claim 1, wherein the plurality of software code portions further define logic for simulating a circuit design that uses the transistor, including calculating a characteristic of the transistor in dependence upon the effective channel length estimated in the step of estimating the effective channel length of the transistor.

8. The system of any of claim 1, wherein the plurality of software code portions further define logic for performing a detailed TCAD level analysis of the transistor using the effective channel length from the estimated effective channel length.

9. The system of claim 8, wherein performing a detailed TCAD level analysis of the transistor comprises a member of the group consisting of:
   calculating an I-V profile of the transistor;
   determining values for drain current Ids in the subthreshold region of the transistor;
   determining electron or hole mobility in the channel of the transistor;
   determining the saturation voltage Vdsat of the transistor;
   determining the Early voltage of the transistor due to substrate current;
   determining transient currents iD(t), iG(t) and iS(t) of the transistor; and
   determining flicker noise in the transistor.

10. The system of claim 1, wherein the dopant profile described by the data set indicates a continuum of source/drain dopant concentration within the semiconductor body, and wherein determining the effective volume in dependence upon the dopant profile comprises summing all sub-volumes of the semiconductor body which are within the containing boundaries and whose source/drain dopant concentration is indicated by the continuum as being below a predetermined value.

11. A method for enhancing simulations of three-dimensional transistors, comprising the steps of:
   providing, to a computer system, a data set describing a dopant profile of a three-dimensional transistor having a semiconductor body, the data set also identifying a gate length for the transistor which is no greater than 20 nm, the data set further identifying surfaces of gate dielectric material adjacent to the semiconductor body, the data set further describing source/drain dopant concentration within each of a plurality of sub-volumes within the semiconductor body;
   the computer system identifying containing boundaries of the channel in dependence upon the surfaces of gate dielectric material adjacent to the semiconductor body as identified in the data set;
   the computer system estimating an effective volume V of the channel of the transistor in dependence upon the dopant profile within the containing boundaries as described in the data set, including summing all of the sub-volumes which are within the containing boundaries and whose source/drain dopant concentration is below a predetermined value;

determining a cross-sectional area A of the channel of the transistor;

estimating the effective channel length of the transistor as the ratio of V to A; and providing the estimated effective channel length for simulation of an aspect of the three-dimensional transistor.

12. The method of claim 11, wherein the predetermined value is the source/drain dopant concentration at a carrier injection point at an interface of channel and a member of the group consisting of source and drain.

13. The method of claim 11, wherein the source/drain dopant concentration of at least one of the sub-volumes which are within the containing boundaries, exceeds the predetermined value.

14. The method of claim 11, wherein determining a cross-sectional area A of the channel of the transistor comprises:

choosing a particular longitudinal position along the channel; and calculating a cross-sectional area of the channel at the particular longitudinal position in dependence upon the surfaces of gate dielectric material identified in the data set.

15. The method of claim 14, wherein the particular longitudinal position is the centroid of a volumetric region determined by identifying containing boundaries of the channel in dependence upon the surfaces of gate dielectric material adjacent to the semiconductor body as identified in the data set.

16. The method of claim 11, further comprising writing the effective channel length into a database.

17. The method of claim 11, further comprising a computer system simulating a circuit design that uses the transistor, including calculating a characteristic of the transistor in dependence upon the effective channel length estimated in the step of estimating the effective channel length of the transistor.

18. The method of claim 11, further comprising the step of performing a detailed TCAD level analysis of the transistor using the effective channel length from the step of estimating the effective channel length.

19. The method of claim 18, wherein performing a detailed TCAD level analysis of the transistor comprises a member of the group consisting of:

calculating an I-V profile of the transistor;

determining values for drain current Ids in the subthreshold region of the transistor;

determining electron or hole mobility in the channel of the transistor;

determining the saturation voltage Vdsat of the transistor;

determining the Early voltage of the transistor due to substrate current;

determining transient currents iD(t), iG(t) and iS(t) of the transistor; and determining flicker noise in the transistor.

20. The system of claim 11, wherein the dopant profile described by the data set indicates a continuum of source/drain dopant concentration within the semiconductor body, and wherein estimating the effective volume in dependence upon the dopant profile comprises summing all sub-volumes of the semiconductor body which are within the containing boundaries and whose source/drain dopant concentration is indicated by the continuum as being below a predetermined value.

21. A system for enhancing simulations of three-dimensional transistors, comprising:

a data processor; and storage accessible by the processor, the data processor configured to perform the steps of:

receiving at an API input data describing aspects of a transistor, the data including identification of surfaces of gate dielectric material adjacent to the semiconductor body, and source/drain dopant concentration within each of a plurality of sub-volumes within the semiconductor body;

estimating the effective channel length of the transistor in dependence upon the input data; and outputting the estimated effective channel length, wherein estimating the effective channel length of the transistor in dependence upon the input data includes:

identifying containing boundaries of the channel in dependence upon the surfaces of gate dielectric material adjacent to the semiconductor body as identified in the data;

estimating an effective volume V of the channel of the transistor in dependence upon the dopant profile within the containing boundaries as described in the data, including summing all of the sub-volumes which are within the containing boundaries and whose source/drain dopant concentration is below a predetermined value;

determining a cross-sectional area A of the channel of the transistor;

estimating the effective channel length of the transistor as the ratio of V to A; and providing the estimated effective channel length for simulation of an aspect of the three-dimensional transistor.

* * * * *